United States Patent
Park et al.

(10) Patent No.: US 12,388,080 B2
(45) Date of Patent: *Aug. 12, 2025

(54) LITHIUM ELECTRODE MANUFACTURING APPARATUS AND MANUFACTURING METHOD

(71) Applicant: LG ENERGY SOLUTION, LTD., Seoul (KR)

(72) Inventors: Gi Su Park, Daejeon (KR); Minsun Song, Daejeon (KR); Jaegil Lee, Daejeon (KR); Kyungsik Hong, Daejeon (KR); Jong Mo Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/519,618

(22) Filed: Nov. 27, 2023

(65) Prior Publication Data
US 2024/0088370 A1    Mar. 14, 2024

Related U.S. Application Data

(63) Continuation of application No. 17/043,892, filed as application No. PCT/KR2019/017262 on Dec. 9, 2019, now Pat. No. 11,870,066.

(30) Foreign Application Priority Data

Dec. 7, 2018  (KR) .................. 10-2018-0156543
Dec. 6, 2019  (KR) .................. 10-2019-0161907

(51) Int. Cl.
*H01M 4/40* (2006.01)
*B65H 35/00* (2006.01)
*H01M 4/1395* (2010.01)

(52) U.S. Cl.
CPC .......... *H01M 4/405* (2013.01); *B65H 35/008* (2013.01); *H01M 4/1395* (2013.01); *B65H 2301/51536* (2013.01)

(58) Field of Classification Search
CPC ...... H01M 4/405; H01M 4/40; H01M 4/1395; H01M 4/139; H01M 4/0402; H01M 4/043;

(Continued)

(56) References Cited

U.S. PATENT DOCUMENTS 11,870,066 B2 *   1/2024   Park .................. H01M 4/1395
2004/0209159 A1  10/2004   Lee et al.
(Continued)

FOREIGN PATENT DOCUMENTS

CN   101060182 A   10/2007
CN   101722370 A    6/2010
(Continued)

OTHER PUBLICATIONS

International Search Report issued in PCT/KR2019/017262 (PCT/ISA/210), dated Mar. 25, 2020.
(Continued)

*Primary Examiner* — Raymond Alejandro
(74) *Attorney, Agent, or Firm* — Birch, Stewart, Kolasch & Birch, LLP

(57) ABSTRACT

An apparatus and a method for manufacturing a lithium electrode may include a cutting stage, a laser irradiation portion and a lithium metal film supply portion, in which a plurality of adsorption holes and a plurality of unit electrode pattern grooves are formed on the upper surface of the cutting stage.

15 Claims, 4 Drawing Sheets

(58) Field of Classification Search
CPC ......... H01M 10/0404; H01M 10/0409; H01M 10/058; H01M 10/12; B65H 35/008; B65H 2301/51536
See application file for complete search history.

(56) References Cited

U.S. PATENT DOCUMENTS

| | | | |
|---|---|---|---|
| 2007/0248885 | A1 | 10/2007 | Bannai et al. |
| 2014/0014633 | A1 | 1/2014 | Chen et al. |
| 2016/0181651 | A1 | 6/2016 | Tanihara et al. |
| 2016/0372779 | A1 | 12/2016 | Hwang et al. |
| 2017/0120380 | A1 | 5/2017 | Zhang et al. |
| 2017/0288272 | A1 | 10/2017 | Kwak et al. |
| 2019/0267606 | A1* | 8/2019 | Lee ................ H01M 4/0433 |

FOREIGN PATENT DOCUMENTS

| | | | |
|---|---|---|---|
| CN | 102623667 | A | 8/2012 |
| CN | 105990564 | A | 10/2016 |
| CN | 106797056 | A | 5/2017 |
| CO | 108213737 | A | 6/2018 |
| JP | 9-274911 | A | 10/1997 |
| JP | 2013-179035 | A | 9/2013 |
| JP | 2016-100281 | A | 5/2016 |
| JP | WO 2014/041588 | A1 | 8/2016 |
| JP | 2017-123321 | A | 7/2017 |
| JP | 2018-67421 | A | 4/2018 |
| JP | 2018-73659 | A | 5/2018 |
| KR | 10-0199210 | B1 | 6/1999 |
| KR | 10-2007-0064690 | A | 6/2007 |
| KR | 10-2008-0101725 | A | 11/2008 |
| KR | 10-2013-0130835 | A | 12/2013 |
| KR | 10-2018-0104389 | A | 9/2018 |
| WO | WO 2011/078083 | A1 | 6/2011 |

OTHER PUBLICATIONS

Search Report dated Apr. 14, 2021 issued in the family, European application No. 19891926.8.

* cited by examiner

【Figure 1】
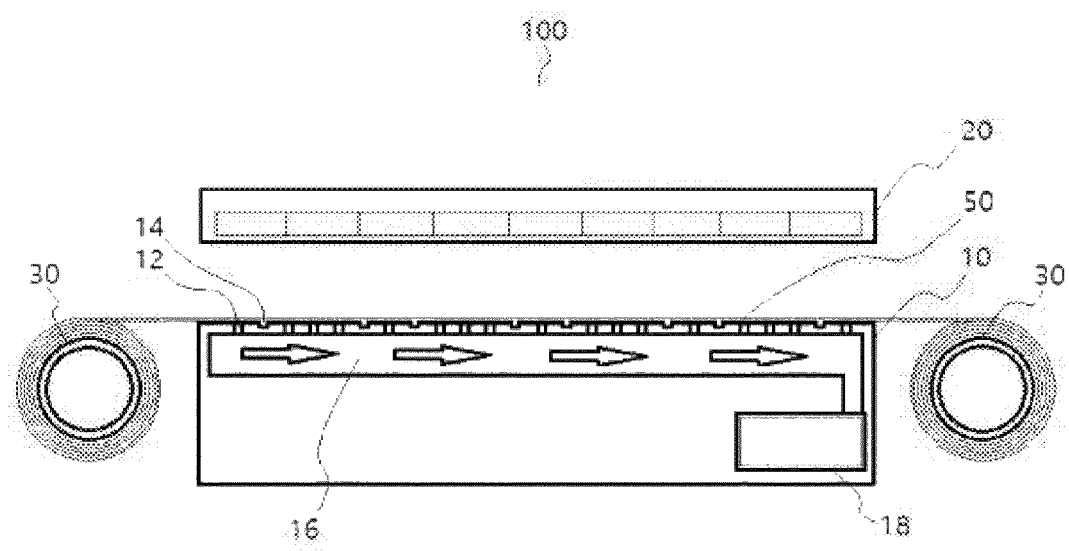
【Figure 2】
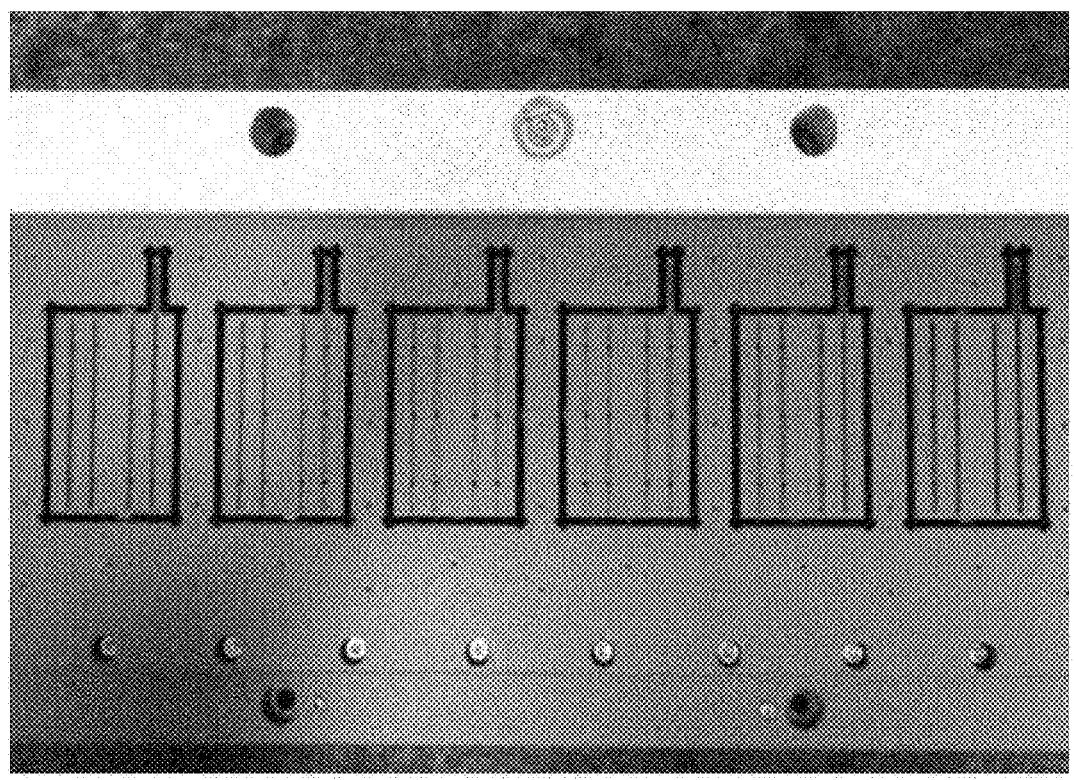

[Figure 3]
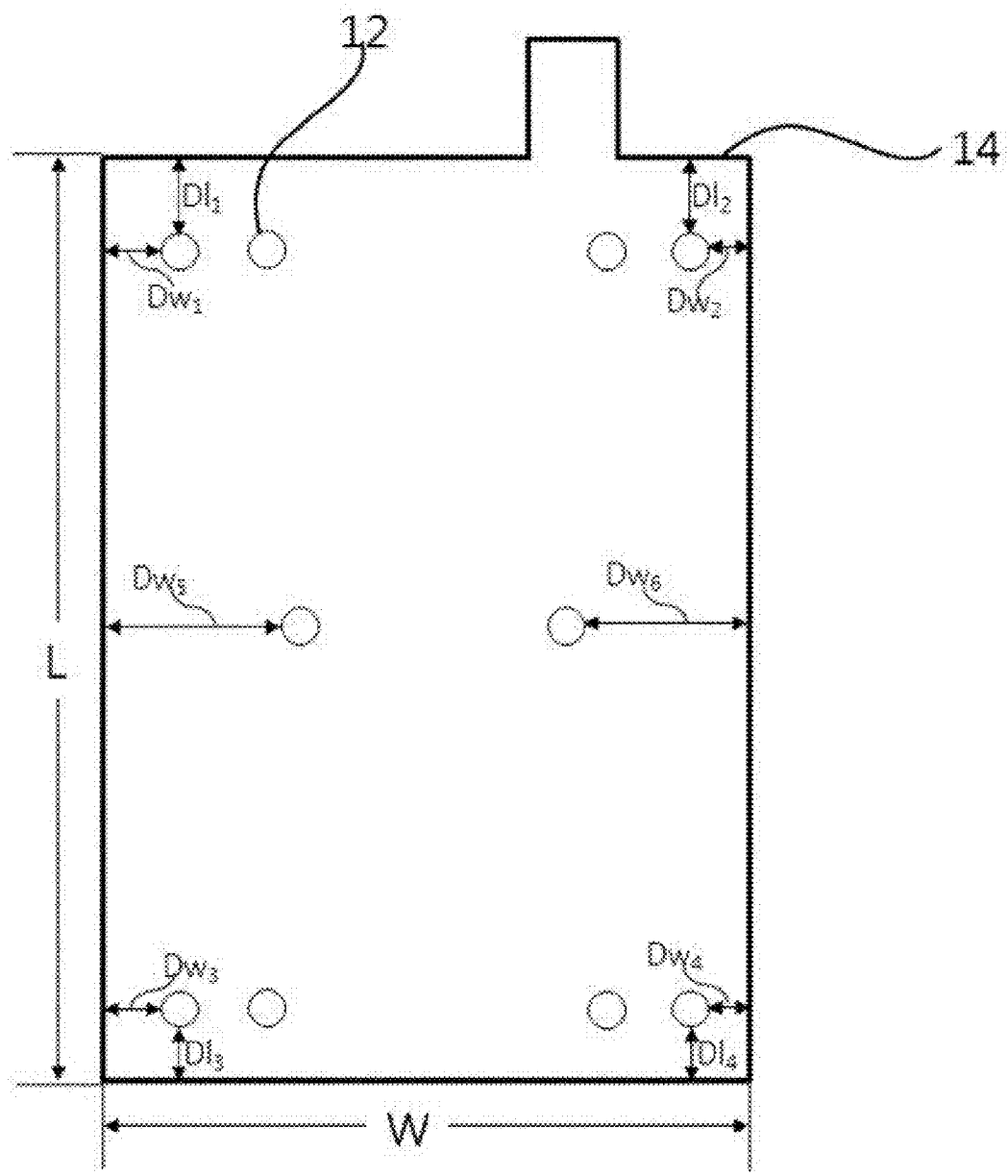

【Figure 4】 Comparative Example 1
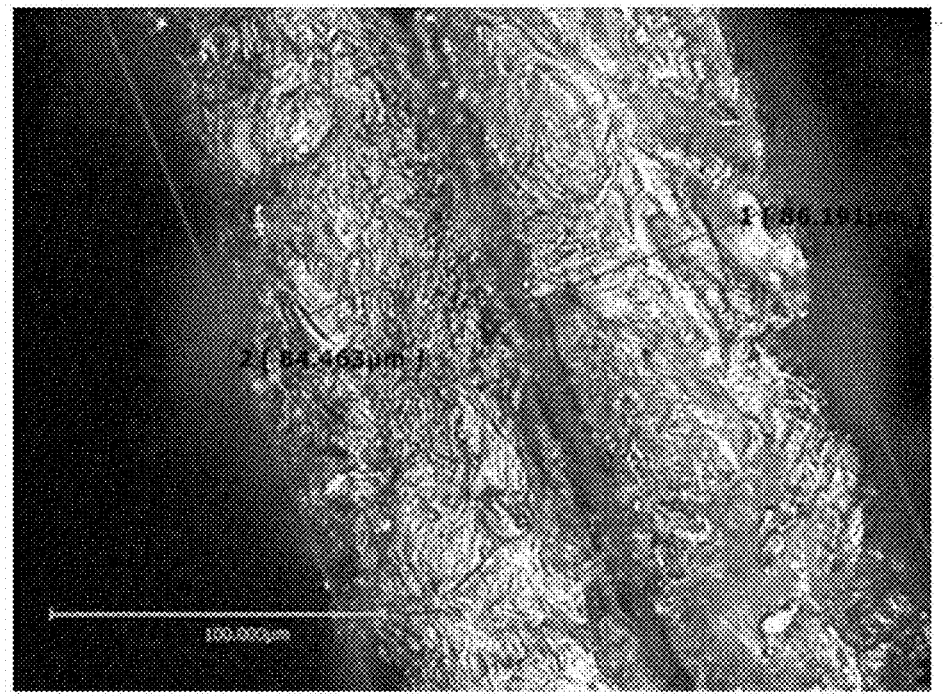
【Figure 5】 Example 1
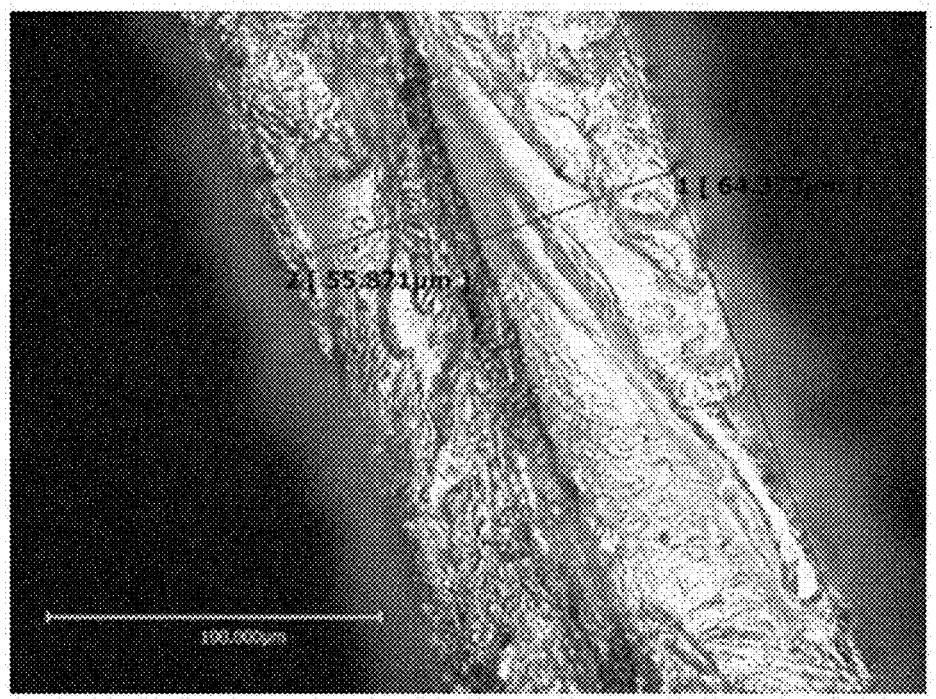

【Figure 6】
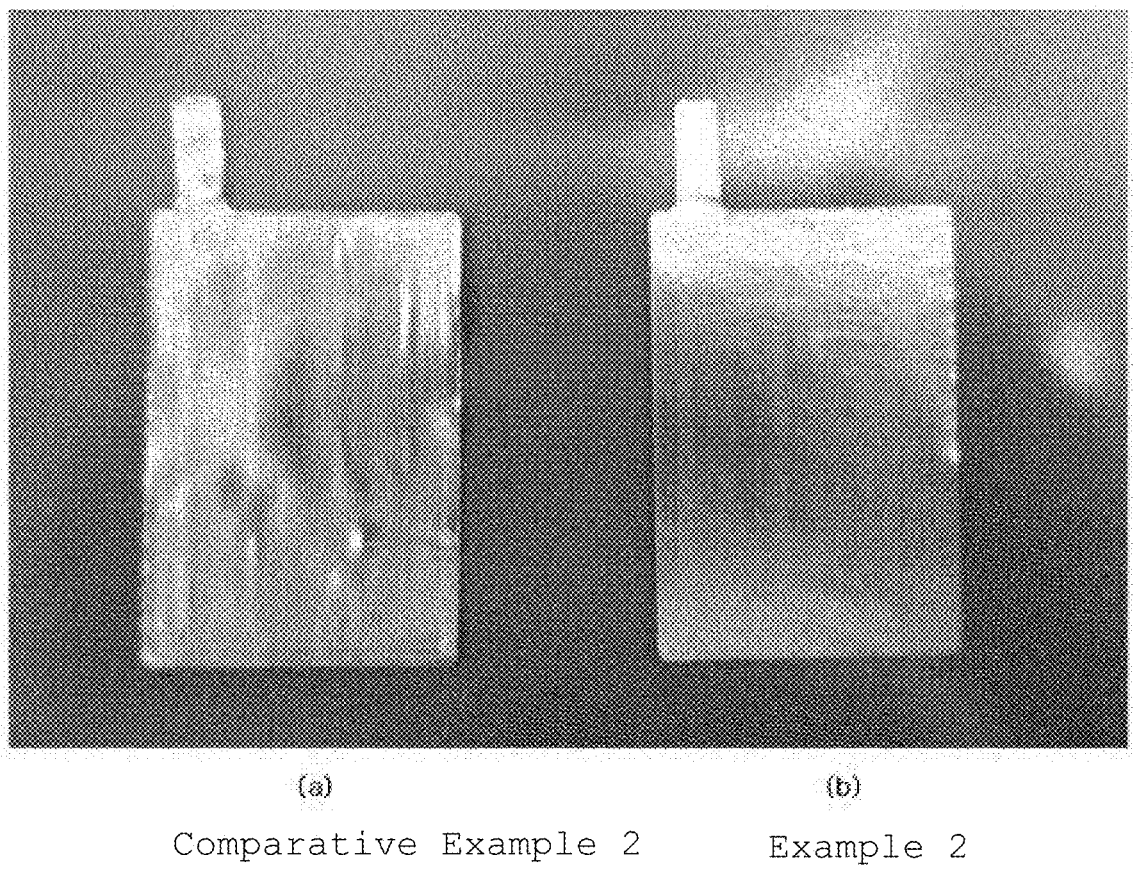
(a) Comparative Example 2    (b) Example 2

LITHIUM ELECTRODE MANUFACTURING APPARATUS AND MANUFACTURING METHOD

The present application is a Continuation of U.S. application Ser. No. 17/043,892, filed on Sep. 30, 2020 (now issued as U.S. Pat. No. 11,870,066, on Jan. 9, 2024), which is the National Phase under 35 U.S.C. § 371 of International Application No. PCT/KR2019/017262, filed on Dec. 9, 2019, which claims the benefit of Korean Patent Application No. 10-2018-0156543 on Dec. 7, 2018 and Korean Patent Application No. 10-2019-0161907 on Dec. 6, 2019 with the Korean Intellectual Property Office, the disclosures of which are herein incorporated by reference in their entireties.

TECHNICAL FIELD

The present invention relates to an apparatus and method for manufacturing a lithium electrode.

BACKGROUND ART

With the rapid development of the electrical, electronic, communication and computer industries, the demand for the secondary battery with high performance and high stability is recently increasing rapidly. Particularly, the weight reduction and miniaturization for the secondary battery, which is a core part, are also required, in accordance with the trend of weight reduction, thinning, miniaturization and portability of batteries and electronic products. In addition, as the need for a new type of energy supply source has arisen due to environmental pollution problems and oil depletion, there has been an increasing need to develop electric vehicles capable of addressing such need. Among secondary batteries, a lithium secondary battery which is light, exhibits high energy density and operating potential and has a long cycle life is in the spotlight recently.

The lithium secondary battery has a structure in which an electrode assembly including a positive electrode, a negative electrode, and a separator interposed between the positive electrode and the negative electrode are laminated or wound, and the lithium secondary battery is composed by embedding this electrode assembly in the battery case and injecting a non-aqueous electrolyte solution into the inside thereof. In that case, the capacities of lithium secondary batteries differ depending on the type of electrode active materials and the capacity at the time of actual driving cannot be secured by a sufficient capacity as much as the theoretical capacity, and thus such batteries have not been commercialized.

In order to obtain a lithium secondary battery with high capacity, metallic materials having high storage capacity characteristics through the alloying reaction with lithium, such as silicon (4,200 mAh/g) and tin (990 mAh/g) are used as the negative electrode active material. However, when the metals such as silicon and tin are used as a negative electrode active material, the volume expands by about 4 times in the charging process, which performs the alloying with lithium, and shrinks in the discharging process. Due to the large volume changes of the electrode that occur repeatedly during the charging/discharging processes, the active materials were gradually differentiated and dropped off from the electrode, and thus, the capacity was rapidly reduced, thereby making it difficult to ensure stability and reliability and thus failing commercialization.

Since lithium metal has an excellent theoretical capacity of 3,860 mAh/g and a low standard hydrogen electrode (SHE) of −3.045 V as compared to the negative electrode active material mentioned above, and thus enables the implementation of batteries with high capacity and high energy density, there are many studies on lithium metal batteries (LMB) using lithium metal as a negative electrode active material for the lithium secondary battery.

However, there is a problem that lithium has a high reactivity as an alkali metal, and has a low melting point and a high ductility compared to other metals, making it difficult to advancing the electrode manufacturing process in a general environment.

Thus, in order to solve the above problems, various techniques related to the production of electrodes using lithium metal have been proposed.

For example, Korean Patent Publication No. 2008-0101725 discloses a method of manufacturing an electrode for a lithium secondary battery through a process of cutting an electrode coated with a coating layer including an active material on a metal foil using a fiber pulse laser.

In addition, Korean Patent Publication No. 2018-0104389 discloses a method of manufacturing an electrode for a secondary battery that presses and cuts an electrode sheet coated with an electrode active material with a mold or a cutter.

However, these prior art documents are for electrodes coated with an electrode active material on an electrode current collector, and are not suitable for electrode production using lithium metal. In addition, these prior arts also have the disadvantage that it is difficult to manufacture precise electrodes at a desired level in the current industrial trends in which secondary batteries which are light, thin, short and small are required. Therefore, there is a need for further development of a technology for manufacturing a lithium electrode through a simple and efficient process.

PRIOR ART DOCUMENTS

Patent Documents

Korean Patent Publication No. 2008-0101725 (2008 Nov. 21), Process for Preparing Electrode of Lithium Secondary Battery Using Fiber Pulse Type Laser Korean Patent Publication No. 2018-0104389 (2018 Sep. 21), Preparation method of electrode for a secondary battery and electrode by the same.

DISCLOSURE

Technical Problem

Accordingly, the inventors of the present invention have conducted various studies to solve the above problems, and as a result, have confirmed that when a specific type of cutting stage is used in the lithium electrode manufacturing apparatus using a laser, the manufacturing processability of the electrode can be improved and thus completed the present invention.

Therefore, it is an object of the present invention to provide an apparatus and a method of manufacturing a lithium electrode excellent in cutting quality and processability of the electrode.

In addition, it is another object of the present invention to provide a lithium electrode manufactured according to the apparatus and method.

In addition, it is still another object of the present invention to provide a lithium secondary battery comprising the lithium electrode.

Technical Solution

In order to achieve the above objects, the present invention provides an apparatus for manufacturing a lithium electrode comprising a lithium metal film supply portion configured to supply a lithium metal film; a cutting stage comprising a plurality of adsorption holes and a plurality of unit electrode pattern grooves formed on an upper surface of the cutting stage; and a laser irradiation portion configured to cut the lithium metal film into a plurality of unit electrodes.

The adsorption hole may be formed in an area of from 0.1 to 5% relative to an area of one of the unit electrode pattern grooves.

The number of adsorption holes may be from 6 to 24 for each unit electrode pattern groove.

Each of the plurality of unit electrode pattern grooves may be formed an interval of 1000 to 5000 μm from adjacent unit electrode pattern grooves.

At least one of the plurality of adsorption holes may be further formed at an interval between adjacent unit electrode pattern grooves.

The plurality of adsorption holes are formed at a separation distance of 1000 to 5000 μm from an edge of the plurality of unit electrode pattern grooves, and each of the plurality of adsorption holes may be formed at intervals of from 5000 to 10000 μm from adjacent adsorption holes among the plurality of adsorption holes.

The adsorption holes are spaced apart by a predetermined distance in a widthwise direction from a left end or a right end of adjacent unit electrode pattern grooves among the plurality of unit electrode pattern grooves, the widthwise minimum separation distance (Dwmin) between a closest among the left end or the right end of a respective one of the plurality of unit electrode pattern grooves and respective adsorption holes may be from 5 to 30% of a widthwise length of the respective electrode pattern groove.

The adsorption holes are spaced apart by a predetermined distance in a longitudinal direction from an upper end or a lower end of adjacent unit electrode pattern grooves among the plurality of unit electrode pattern grooves, a longitudinal minimum separation distance (Dlmin) closest to the upper end or the lower end of a respective one of the plurality unit electrode pattern grooves and respective adsorption holes may be from 5 to 30% of a longitudinal length of the respective unit electrode pattern groove.

A cross section of each of the plurality of adsorption holes may have at least one shape selected from the group consisting of circular, elliptical, polygonal, linear, wave and zigzag.

The cutting stage may further comprise an air flow guide tube configured to communicate with the plurality of adsorption holes and form a flow of air in the horizontal direction.

The cutting stage may further comprise an air suction device connected to the air flow guide tube.

The lithium metal film supply portion may comprise a first winding roll configured to hold the lithium metal film in a wound state and release the wound lithium metal film for cutting of the plurality of unit electrodes, and a second winding roll configured to wind the lithium metal film after being cut into the plurality of unit electrodes.

The laser irradiation portion may be further configured to cut a lithium metal film having a thickness of from 30 to 150 μm.

In addition, the present invention provides a method for manufacturing a lithium electrode, comprising a plurality of unit electrodes using the apparatus, wherein the manufacturing supplying the lithium metal film onto the cutting stage, and irradiating a laser of the laser irradiation portion to one surface of the lithium metal film and to cut the lithium metal film a plurality of unit electrodes, wherein an upper surface of the cutting stage may comprise a plurality of unit electrode pattern grooves, the plurality of unit electrode pattern grooves are arranged at arranged at regular intervals, and the plurality of adsorption holes, the plurality of adsorption holes are formed in an inner region of the plurality of unit electrode pattern grooves.

In addition, the present invention provides a lithium electrode manufactured by the apparatus and method.

In addition, the present invention provides a lithium secondary battery comprising the lithium electrode.

Advantageous Effects

The apparatus of manufacturing a lithium electrode according to the present invention may have an improved adsorption force on lithium metal by introducing a specific type of cutting stage and thus may not only have excellent cutting quality of the electrode, but also may form a precise lithium electrode which minimizes the occurrence of burrs. In addition, according to the present invention, a large number of lithium electrodes can be easily manufactured to enable mass production.

DESCRIPTION OF DRAWINGS

FIG. 1 is a cross-sectional view showing the lithium electrode manufacturing apparatus according to an embodiment of the present invention.

FIG. 2 is a front photograph of a cutting stage provided in the lithium electrode manufacturing apparatus according to an embodiment of the present invention.

FIG. 3 is a schematic diagram for explaining the shape of the unit electrode pattern grooves according to an embodiment of the present invention.

FIG. 4 is a cross-sectional photograph of Comparative Example 1 according to Experimental Example 1 of the present invention.

FIG. 5 is a cross-sectional photograph of Example 1 according to Experimental Example 1 of the present invention.

FIG. 6 is a photograph of visual observation of lithium electrodes prepared by Example 1 of the present invention and Comparative Example 2 ((a): Comparative Example 2, (b): Example 1).

BEST MODE

Hereinafter, preferable embodiments of the present invention will be described in detail with reference to the accompanying drawings. Prior to describing the present invention, if it is determined that the detailed description of the related known function and configuration may unnecessarily obscure the subject matter of the present invention, the description thereof will be omitted.

The following description and drawings illustrate specific embodiments to enable those skilled in the art to easily implement the described apparatus and methods. Other embodiments may incorporate other structural and logical variations. Individual components and functions may be generally selected unless explicitly required, and the order of the processes may be changed. Portions and features of some embodiments may be included in, or replaced by, other embodiments.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The terminology used herein is for the purpose of describing particular embodiments only and is not intended to be limiting of the present invention. The singular forms "a," "an," and "the" include plural referents unless the context clearly dictates otherwise. It is to be understood that the terms "comprise", or "have", etc., as used in the present specification, are intended to designate the presence of stated features, numbers, steps, operations, components, parts or combinations thereof, but not to preclude the possibility of the presence or addition of one or more other features, numbers, steps, operations, components, parts, or combinations thereof.

For convenience of description in the present invention, when defining a direction, hereinafter, the "vertical direction" means a direction perpendicular to the advancing direction of the lithium metal film, and the "horizontal direction" means a direction parallel to the advancing direction of the lithium metal film.

Since lithium metal used as a negative electrode active material has a high energy density (3,860 mAh/g) with low oxidation/reduction potential (−3.045 V vs. standard hydrogen electrode) and atomic weight (6.94 g/a.u.), the lithium metal battery can be miniaturized and weight-lightened, while also ensuring high capacity and high energy density, and thus, is attracting attention as a next generation battery.

In general, a lithium secondary battery including a lithium metal battery is manufactured by forming a positive electrode and a negative electrode and interposing a separator therebetween to make an electrode assembly, and then mounting it inside a battery case and injecting an electrolyte into the electrode assembly. In this case, the electrode assembly is manufactured in various sizes depending on the size and shape of the battery case and the capacity required in the field used. For this purpose, a process of cutting the electrode constituting the electrode assembly to a predetermined size is essential.

However, since lithium metal not only has high chemical reactivity but also has high ductility, for example, lithium metal reacts explosively with water and reacts easily with oxygen in the atmosphere, as described above, the process conditions for cutting the electrode are not only difficult, but also it is difficult to secure stable quality of the manufactured electrode.

To this end, in the prior art, a method such as changing the type of laser or the shape of the cutter is used, but there is a limit to the application to the lithium electrode containing lithium metal.

Accordingly, the present invention provides an apparatus and method for manufacturing a lithium electrode capable of manufacturing a lithium electrode having excellent quality by introducing a specific type of cutting stage (e.g., cutting platform) in manufacturing a plurality of unit electrodes from lithium metal.

FIG. 1 is a view schematically showing a lithium electrode manufacturing apparatus according to an embodiment of the present invention.

Referring to FIG. 1, an apparatus for manufacturing a lithium electrode 100 according to an embodiment of the present invention includes a cutting stage 10, a laser irradiation portion 20, and a lithium metal film supply portion 30, wherein a plurality of adsorption holes 12 and a plurality of unit electrode pattern grooves 14 are formed while a lithium metal film supply is on an upper surface of the cutting stage 10.

In particular, in the present invention, the cutting stage 10 comprises a plurality of unit electrode pattern grooves 14 arranged at regular intervals on the upper surface and adsorption holes 12 formed in the inner region of the unit electrode pattern grooves 14. The cutting stage 10 is disposed on one side of the traveling surface of the electrode material, is rectangular in a plan view, and has a predetermined thickness. The cutting stage 10 is made of a metallic material.

FIG. 2 is a front photograph of a cutting stage provided in the lithium electrode manufacturing apparatus according to an embodiment of the present invention. Referring to FIG. 2, the cutting stage 10 according to the present invention includes a plurality of unit electrode pattern grooves 14 having a slit shape corresponding to the shape of the unit electrode so as to cut a lithium metal film, which is an electrode material, into the shape of the unit electrode. In particular, in the cutting stage of the present invention, the unit electrode pattern grooves are arranged at regular intervals in order to minimize damage of the electrode material due to reflection generated during the cutting process through a laser to be described later.

Accordingly, a plurality of unit electrode pattern grooves 14 may be arranged at distances of from 1000 to 5000 μm, preferably from 2000 to 4000 μm from adjacent unit electrode pattern grooves. When the distance between the unit electrode pattern grooves formed on the cutting stage is less than the above range, damage may occur in adjacent unit electrodes. On the contrary, when the distance is out of the above range, unnecessary consumption of the electrode material may be increased, thereby resulting in a problem of reduced productivity.

In addition, as shown in FIG. 2, the cutting stage of the present invention comprises adsorption holes 12 formed in the inner region of the unit electrode pattern grooves. In general, since the laser at the time of performing the cutting process using the laser is irradiated in the vertical direction of the cutting object, fixing the cutting object on the cutting stage is effective for improving the cutting quality. Therefore, in the present invention, the adsorption holes serve to increase cutting efficiency by fixing the lithium metal film on the cutting stage.

In addition, referring to FIG. 1, the cutting stage 20 includes adsorption holes 12 penetrating in the vertical direction of the cutting stage. By adsorbing the lithium metal film disposed on the cutting stage 10 through the adsorption holes 12, the lithium metal film, which is an electrode material, is fixed on the cutting stage to minimize the difference of elevation of the lithium metal film, which is a cutting object, during the advancing of the cutting process, thereby precisely cutting it and thus minimizing burrs generated on the cutting surface.

In this case, for the adsorption, the cutting stage 10 may further comprise an air flow guide tube 16 which is communicating with the plurality of adsorption holes 12 therein and is for forming a flow of air in the horizontal direction. Particularly, in one embodiment of the present invention, it is preferable in that the adsorption is indirectly made to minimize the damage of the lithium metal film having a soft property, by forming the air flow in the horizontal direction during the adsorption.

In addition, the cutting stage 10 may further comprise an air suction device 18 connected to the air flow guide tube 16 in the cutting stage 10 to induce the aforementioned air flow. In this case, the air suction device 18 is not particularly limited, and a method commonly used in the art may be applied. As an example, a vacuum device can be used.

The adsorption holes 12 are formed in the inner region of the unit electrode pattern grooves 14, wherein the formed area of the adsorption hole may be from 0.1 to 5%, preferably from 0.5 to 1% relative to the area of one of the unit electrode pattern grooves. When the formed area of the adsorption holes is less than the above range, the adsorption force is insufficient to fix the cutting object in a balanced manner, which may cause damage during the laser irradiation. On the contrary, when the formed area of the adsorption holes exceeds the above range, the shape of the unit electrode may be changed, thereby degrading battery performance.

In addition, the number of adsorption holes formed in the inner region of the unit electrode pattern grooves may be from 6 to 24, preferably from 10 to 20 per one of the unit electrode pattern grooves.

In addition, the cross section of the adsorption holes may have at least one shape selected from the group consisting of circular, elliptical, polygonal, linear, wave and zigzag shapes.

The position of the adsorption holes formed in the inner region of the unit electrode pattern grooves together with the formed area, number and cross section of the adsorption holes described above can be described as shown in FIG. 3.

FIG. 3 is a schematic view for explaining the shape of the unit electrode pattern grooves 14 according to an embodiment of the present invention, i.e., the position of the adsorption holes 12 formed in the inner region of the unit electrode pattern grooves 14.

The adsorption holes 12 may be formed at a separation distance of from 1000 to 5000 μm from an edge of the unit electrode pattern grooves 14, and each of the adsorption holes 12 may be formed at a distance of from 5000 to 10000 μm from each other.

Specifically, the adsorption holes 12 may be spaced apart by a predetermined distance from an edge that is an outer circumferential surface of the unit electrode pattern grooves 14. Such a spaced arrangement may be disposed at one or more positions of the left, right, top, and bottom of the unit electrode pattern grooves 14, and the holding force with the lithium metal film as the electrode material can be improved by this spaced arrangement of the adsorption holes 12 on the cutting stage.

Referring to FIG. 3, the widthwise length of the unit electrode pattern grooves 14 is referred to as W, and the length of the longitudinal direction is referred to as L.

In this case, the adsorption holes 12 are spaced apart by a predetermined distance in a widthwise direction from the left or right end of the unit electrode pattern grooves 14. When the widthwise separation distances of the adsorption holes are $Dw_1$, $Dw_2$, $Dw_3$, $Dw_4$, $Dw_5$, and $Dw_6$, respectively, the minimum value among them, that is, the widthwise minimum separation distance ($Dw_{min}$) that is closest to the left or right end of the unit electrode pattern grooves of the adsorption holes may be from 5 to 30%, preferably from 10 to 20% of the widthwise length (W) of the unit electrode pattern grooves.

Equally, the adsorption holes 12 are spaced apart by a predetermined distance in the longitudinal direction from the upper or lower end of the unit electrode pattern grooves 14. When the longitudinal direction separation distances of the adsorption holes are $Dl_1$, $Dl_2$, $Dl_3$, and $Dl_4$, the minimum value among them, that is, the longitudinal direction minimum separation distance (Dlmin) that is closest to the upper or lower end of the unit electrode pattern grooves of the adsorption holes may be from 5 to 30%, preferably from 10 to 20% of the longitudinal length (L) of the unit electrode pattern grooves.

The widthwise minimum separation distance ($Dw_{min}$) or the longitudinal direction minimum separation distance ($Dl_{min}$) of the adsorption holes defined above is preferably in the above-described range so that adsorption with a lithium metal film, which is an electrode material, on the cutting stage may sufficiently occur. When the widthwise minimum separation distance ($Dw_{min}$) or the longitudinal direction minimum separation distance ($Dl_{min}$) of the adsorption holes is less than the above-mentioned range, there is a problem that the equilibrium state of the cutting object cannot be maintained due to interference between adsorption holes. On the contrary, when widthwise minimum separation distance ($Dw_{min}$) or the longitudinal direction minimum separation distance ($Dl_{min}$) exceeds the above range, there is a problem that the holding force on the cutting object is reduced and an equilibrium state is not secured.

In addition, at least one adsorption holes 12 may be further formed between the unit electrode pattern grooves 14.

The laser irradiation portion 20 is configured to output a laser, and includes a device for irradiating a laser onto the entire surface of the lithium metal film.

The laser is not particularly limited, and may be one commonly used in the art. For example, the laser may be a laser having an ultraviolet (UV) wavelength to an infrared (IR) wavelength. This is because damage to the lithium metal can be minimized when a laser within the wavelength range is used.

The laser may preferably be selected from UV lasers, disk lasers, Nd-Yag lasers and fiber lasers, among which disk lasers and fiber lasers are more preferred.

It may be necessary to consider the spot size, speed, power, etc. of the laser, which may vary depending on the cutting object. For example, the spot size of the laser may be from 0 to 100 μm, the speed may be from 10 to 500 mm/sec, and the output may be from 10 to 200 W.

The lithium metal film supply portion 30 has a configuration for supplying a lithium metal film to the cutting stage 10, and may comprises a winding roll to release for cutting of the unit electrode in a state where the lithium metal film was wound, and a winding roll for winding a lithium metal film in a state where the unit electrode was cut.

The lithium metal film supply portion 30 may include a lithium metal film having a thickness of from 30 to 150 μm.

In addition, the present invention can provide a method for manufacturing a lithium electrode using the above-described lithium electrode manufacturing apparatus.

The method for manufacturing a lithium electrode according to an embodiment of the present invention comprises the steps of placing the lithium metal film on the cutting stage, and irradiating a laser to one surface of the lithium metal film and cutting it into unit electrodes, wherein the upper surface of the cutting stage comprises a plurality of unit electrode pattern grooves arranged at regular intervals and adsorption holes formed in the inner region of the unit electrode pattern grooves.

First, according to one embodiment of the present invention, the step of placing the lithium metal film on the cutting stage is comprised.

The lithium metal film is an electrode material, and may be used in the form of a foil or sheet.

Since the electrode for the conventional lithium secondary battery is made by applying the electrode active material on a current collector such as aluminum or copper, the thickness is from 200 to 500 µm. However, since the lithium electrode according to the present invention includes a lithium metal thin film, there is a difference in thickness. Specifically, the thickness of the lithium metal film may be from 30 to 150 µm, preferably from 45 to 100 µm. When the thickness of the lithium metal film is less than the above range, the performance and lifetime of the battery may be lowered. On the contrary, when the thickness of the lithium metal film exceeds the above range, the lithium electrode may be thickened and may be disadvantageous for commercialization.

Subsequently, the step of irradiating a laser to one surface of the lithium metal film and cutting it into unit electrodes is comprised.

At this time, the laser irradiation conditions should consider the absorptivity of the lithium electrode to be cut and reflectance of the cutting stage.

In addition, as described above, the cutting stage used for laser irradiation comprises a plurality of unit electrode pattern grooves arranged at regular intervals on the upper surface and adsorption holes formed in the inner region of the unit electrode pattern grooves to enable precise cutting of the lithium metal film, thereby being capable of producing multiple unit electrodes at the same time in one cutting process.

The lithium electrode manufactured by the above-described manufacturing apparatus and manufacturing method may not only have excellent cutting quality but also minimize the occurrence of burrs. In addition, it is possible to produce a plurality of electrodes of the desired size in only one cutting process, thereby being carried out at the optimum process conditions in the mass production process. In addition, the lithium secondary battery comprising the lithium electrode according to the present invention has excellent performance and lifetime characteristics.

In addition, the present invention provides a lithium secondary battery comprising the lithium electrode manufactured from the above-described manufacturing apparatus and manufacturing method.

The lithium secondary battery comprises a positive electrode, a negative electrode, and an electrolyte interposed between the positive electrode and the negative electrode, wherein the negative electrode comprises a lithium electrode according to the present invention.

The positive electrode may comprise a positive electrode current collector and a positive electrode active material coated on one or both sides of the positive electrode current collector.

The positive electrode current collector supports the positive electrode active material and is not particularly limited as long as it has high conductivity without causing chemical change in the battery. For example, copper, stainless steel, aluminum, nickel, titanium, palladium, sintered carbon; copper or stainless steel surface-treated with carbon, nickel, silver or the like; aluminum-cadmium alloy or the like may be used as the positive electrode current collector.

The positive electrode current collector can enhance the bonding force with the positive electrode active material by having fine irregularities on its surface, and may be formed in various forms such as film, sheet, foil, mesh, net, porous body, foam, or nonwoven fabric.

The positive electrode active material may comprise a positive electrode active material and optionally an electrically conductive material, and a binder.

The positive electrode active material may comprise, but is not limited to, a layered compound such as lithium cobalt oxide($LiCoO_2$) and lithium nickel oxide ($LiNiO_2$), or a compound substituted by one or more transition metals; lithium manganese oxide such as chemical formula $Li_{1+x}Mn_{2-x}O_4$ (0≤x≤0.33), $LiMnO_3$, $LiMn_2O_3$, $LiMnO_2$; lithium copper oxide ($Li_2CuO_2$); vanadium oxide such as $LiV_3O_8$, $LiV_3O_4$, $V_2O_5$, $Cu_2V_2O_7$; Ni-site lithium nickel oxide represented by chemical formula of $LiNi_{1-x}M_xO_2$ (M=Co, Mn, Al, Cu, Fe, Mg, B or Ga; 0.01≤x≤0.3); lithium manganese composite oxide represented by chemical formula of $LiMn_{2-x}M_xO_2$ (M=Co, Ni, Fe, Cr, Zn or Ta; 0.01≤x≤0.1) or $Li_2Mn_3M_xO_8$ (M=Fe, Co, Ni, Cu or Zn); lithium manganese complex oxide of spinel structure represented by $LiNi_xMn_{2-x}O_4$; $LiCoPO_4$; $LiFePO_4$; elemental sulfur ($S_8$); sulfur-based compounds such as $Li_2S_n$ (n≥1), an organic sulfur compound, and a carbon-sulfur polymer (($C_2S_x)_n$: x=2.5~50, n≥2), or the like. When the positive electrode active material is elemental sulfur, since the sulfur material alone is not electrically conductive, it may be used in combination with the carbon material.

The electrically conductive material is a material that electrically connects an electrolyte to a positive electrode active material and serves as a path through which electrons move from the current collector to the positive electrode active material, and is not particularly limited as long as it has porosity and conductivity without causing chemical changes in the lithium secondary battery.

For example, carbon-based materials having porosity may be used as an electrically conductive material. Such carbon-based materials may comprise carbon black, graphite, graphene, activated carbon, carbon fiber, and the like. In addition, metallic fibers such as metal mesh; metallic powder such as copper, silver, nickel, and aluminum; or organic electrically-conductive materials such as polyphenylene derivatives may be also used. The electrically conductive materials may be used alone or in combination.

Products that are currently marketed as conductive material may comprise acetylene black series (products from Chevron Chemical Company or Gulf Oil Company), Ketjen Black EC series (products from Armak Company), Vulcan XC-72 (a product from Cabot Company) and Super P (a product from MMM). For example, acetylene black, carbon black, graphite and the like can be used.

In addition, the positive electrode may further comprise a binder. The binder enhances adhesion force between the components constituting the positive electrode and between them and the current collector, and any binder known in the art can be used as the binder.

For example, the binder may be fluororesin-based binders comprising polyvinylidene fluoride (PVdF) or polytetrafluoroethylene (PTFE); rubber-based binders comprising styrene butadiene rubber (SBR), acrylonitrile-butadiene rubber, and styrene-isoprene rubber; cellulose-based binders comprising carboxymethylcellulose (CMC), starch, hydroxypropyl cellulose, and regenerated cellulose; polyalcohol-based binders; polyolefin-based binders comprising polyethylene and polypropylene; polyimide-based binders; polyester-based binders; and silane-based binders, or mixtures or copolymers of two or more thereof.

The positive electrode as described above can be prepared by a conventional method known in the art. For example, the positive electrode can be prepared by mixing and stirring a solvent, if necessary, a binder, an electrically conductive material, and a dispersant in a positive electrode active material to prepare a slurry, then applying (coating) the slurry to a current collector of a metal material, compressing and drying it.

The negative electrode is as described above.

The electrolyte comprises electrolytic salts and is used for causing an electrochemical oxidation or reduction reaction between a positive electrode and a negative electrode through these.

The electrolyte may be a non-aqueous electrolyte or a solid electrolyte which does not react with lithium metal, but is preferably a non-aqueous electrolyte, and comprises an electrolyte salt and an organic solvent.

The electrolytic salt which is comprised in the non-aqueous electrolyte solution may be lithium salt. The lithium salt can be used without limitation as long as it is commonly used in an electrolyte solution for a lithium secondary battery. For example, the lithium salt may be LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, $LiN(SO_2F)_2$, lithium chloroborane, lithium lower aliphatic carboxylate, tetraphenyl lithium borate, lithium imide, etc.

As the organic solvent contained in the non-aqueous electrolyte solution, those conventionally used in an electrolyte solution for a lithium secondary battery may be used without limitation, and for example, ether, ester, amide, linear carbonate, cyclic carbonate, etc. may be used alone or in combination of two or more. Among them, representatively, ether-based compounds may be comprised.

The ether-based compound may comprise acyclic ethers and cyclic ethers.

For example, the acyclic ether may be, but is not limited to, at least one selected from the group consisting of dimethyl ether, diethyl ether, dipropyl ether, methylethyl ether, methylpropyl ether, ethylpropyl ether, dimethoxyethane, diethoxyethane, methoxyethoxyethane, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether, polyethylene glycol methylethyl ether.

For example, the cyclic ether may be, but is not limited to, at least one selected from the group consisting of 1,3-dioxolane, 4,5-dimethyl-dioxolane, 4,5-diethyl-dioxolane, 4-methyl-1,3-dioxolane, 4-ethyl-1,3-dioxolane, tetrahydrofuran, 2-methyltetrahydrofuran, 2,5-dimethyltetrahydrofuran, 2,5-dimethoxytetrahydrofuran, 2-ethoxytetrahydrofuran, 2-methyl-1,3-dioxolane, 2-vinyl-1,3-dioxolane, 2,2-dimethyl-1,3-dioxolane, 2-methoxy-1,3-dioxolane, 2-ethyl-2-methyl-1,3-dioxolane, tetrahydropyran, 1,4-dioxane, 1,2-dimethoxy benzene, 1,3-dimethoxy benzene, 1,4-dimethoxy benzene, and isosorbide dimethyl ether.

Examples of the ester of the organic solvent may comprise, but is not limited to, at least one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone, and ε-caprolactone, or a mixture of two or more thereof.

Specific examples of the linear carbonate compound may comprise, but is not limited to, at least one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof.

In addition, specific examples of the cyclic carbonate compound may comprise at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and halides thereof, or a slurry of two or more thereof. Examples of such halides comprise, but are not limited to, fluoroethylene carbonate (FEC) and the like.

The injection of the non-aqueous electrolyte solution can be performed at an appropriate stage during the manufacturing process of the electrochemical device, depending on the manufacturing process and required physical properties of the final product. That is, such injection can be carried out before assembling the electrochemical device or in the final stage of assembling the electrochemical device.

A separator may be additionally interposed between the positive electrode and the negative electrode as mentioned above. The separator is a physical separator having a function of physically separating both electrodes in the lithium secondary battery of the present invention, and can be used without particular limitation as long as it is used as a separator in the conventional lithium secondary battery. Particularly, a separator with low resistance to ion migration in the electrolyte and excellent impregnating ability for the electrolyte solution is preferable.

The separator may be formed of a porous substrate, and the porous substrate may be any porous substrate conventionally used in an electrochemical device. For example, a polyolefin-based porous membrane or a nonwoven fabric may be used as the porous substrate, but it is not particularly limited thereto.

Examples of the polyolefin-based porous membrane may comprise a membrane formed of polyolefin-based polymer, such as polyethylene such as high-density polyethylene, linear low-density polyethylene, low density polyethylene and ultra-high molecular weight polyethylene, polypropylene, polybutylene, and polypentene, alone or a mixture thereof.

The nonwoven fabric may comprise, in addition to the polyolefin-based nonwoven fabric, for example, a nonwoven fabric formed of polyester such as polyethyleneterephthalate, polybutyleneterephthalate, and polyethylenenaphthalate, polyacetal, polyamide, polycarbonate, polyimide, polyetheretherketone, polyethersulfone, polyphenyleneoxide, and polyphenylenesulfide alone or a mixture thereof. The structure of the nonwoven fabric may be a spun bond nonwoven fabric or a melt blown nonwoven fabric composed of long fibers.

The thickness of the porous substrate is not particularly limited, but may be from 1 to 100 μm, preferably from 5 to 50 μm.

The size and porosity of the pores present in the porous substrate are also not particularly limited, but may be from 0.001 μm to 50 μm and from 10 to 95%, respectively.

In the case of the lithium secondary battery according to the present invention, it is possible to perform laminating or stacking and folding processes of the separator and the electrode, in addition to the winding process which is a general process.

The shape of the lithium secondary battery is not limited, and may be various shapes such as a cylindrical shape, a laminate shape, and a coin shape.

In addition, the present invention provides a battery module including the lithium secondary battery as a unit cell.

The battery module may be used as a power source of medium or large-sized devices requiring high temperature stability, long cycle characteristics, high capacity characteristics and the like.

Examples of the medium or large-sized devices may comprise, but are not limited to, a power tool that is powered and moved by an electric motor; electric cars including an electric vehicle (EV), a hybrid electric vehicle (HEV), a plug-in hybrid electric vehicle (PHEV), and the like; an electric motorcycle including an electric bike (E-bike) and an electric scooter (E-scooter); an electric golf cart; and a power storage system.

MODE FOR INVENTION

Hereinafter, preferred examples of the present invention will be described in order to facilitate understanding of the present invention. It will be apparent to those skilled in the art, however, that the following examples are illustrative of the present invention and that various changes and modifications can be made within the scope and spirit of the present invention, and it is obvious that such changes and modifications are within the scope of the appended claims.

EXAMPLES AND COMPARATIVE EXAMPLES

Example 1

6 unit electrode patterns were included, and each of the inner region of the unit electrode patterns had 12 circular adsorption holes having a diameter of 100 μm, and the horizontal and vertical spacing therebetween was 5,000 μm and 10,000 μm, respectively. A lithium metal having a thickness of 100 μm was placed on a cutting stage which has the widthwise minimum separation distance ($Dw_{min}$) and the longitudinal direction minimum separation distance ($Dl_{min}$) of the adsorption holes of 15% of the widthwise and longitudinal lengths of the unit electrode pattern grooves, respectively.

A lithium electrode was manufactured by irradiating a laser under conditions of a current amount of 95%, a frequency of 20 kHz, and a speed of 260 mm/s, while adsorbing the prepared lithium metal, by using a vacuum generated by passing nitrogen and argon gas at a rate of 1 L/min in the horizontal direction with respect to the cutting stage.

Comparative Example 1

A lithium electrode was manufactured in the same manner as in Example 1, except that a cutting stage containing a unit electrode pattern without adsorption holes is used.

Comparative Example 2

A lithium electrode was manufactured in the same manner as in Example 1, except that the flow direction of nitrogen and argon gas is changed in the vertical direction to the cutting stage during adsorption.

Experimental Example 1. Evaluation of the Surface of Lithium Electrode

The surface conditions of the electrodes prepared in Examples and Comparative Examples were checked using a roughness measuring device, an optical microscope, and the naked eye. The results obtained at this time are shown in FIGS. 4 to 6.

As shown in FIG. 4, it was confirmed that the lithium electrode prepared in Comparative Example 1 was difficult to cut into the desired shape, the rear part of the lithium electrode was damaged by reflection of the cutting stage, and burrs were formed at a considerable level on the edge of the electrode. Referring to FIG. 5 in comparison with the comparative example, it was confirmed that the lithium electrode prepared in Example 1 not only had the desired shape but also hardly caused damage and burr at the rear part.

In addition, it was confirmed that in the case of the lithium electrode according to Example 1, as shown in (b) of FIG. 6, the surface state is uniform, whereas in the case of Comparative Example 2, severe distortion phenomenon occurs in the final manufactured lithium metal as a result of adsorption in the vertical direction, as shown in (a) of FIG. 6.

DESCRIPTION OF SYMBOLS

100: Apparatus for manufacturing a lithium electrode
10: Cutting stage
12: Adsorption hole
14: Unit electrode pattern groove
16: Air flow guide tube
18: Air suction device
20: Laser irradiation portion
30: Lithium metal film supply portion
50: Lithium metal film

The invention claimed is:

1. An apparatus for manufacturing a lithium electrode, the apparatus comprising:
   a lithium metal film supply portion configured to supply a lithium metal film;
   a cutting stage comprising:
      a plurality of unit electrode pattern grooves; and
      a plurality of adsorption holes; and
   a laser irradiation portion configured to cut the lithium metal film into a plurality of unit electrodes,
   wherein the plurality of adsorption holes are formed at a separation distance of 1000 to 5000 micrometers (μm) from an edge of the plurality of unit electrode pattern grooves, and
   wherein each of the plurality of adsorption holes is formed at intervals of from 5000 to 10000 μm from adjacent adsorption holes among the plurality of adsorption holes.

2. The apparatus according to claim 1, wherein the plurality of adsorption holes are formed in an area of 0.1 to 5% relative to an area of one of the unit electrode pattern grooves.

3. The apparatus according to claim 2, wherein a number of the plurality of adsorption holes is from 6 to 24 for each unit electrode pattern groove.

4. The apparatus according to claim 2, wherein each of the plurality of unit electrode pattern grooves is formed at an interval of 1000 to 5000 μm from adjacent unit electrode pattern grooves.

5. The apparatus according to claim 4, wherein at least one of the plurality of adsorption holes is further formed in an interval between adjacent unit electrode pattern grooves.

6. The apparatus according to claim 1,
   wherein the plurality of adsorption holes are spaced apart by a predetermined distance in a widthwise direction from a left end or a right end of adjacent unit electrode pattern grooves among the plurality of unit electrode pattern grooves, and wherein a widthwise minimum separation distance ($Dw_{min}$) between a closest among the left end or the right end of a respective one of the plurality of unit electrode pattern grooves and respective adsorption holes is from 5 to 30% of a widthwise length of the respective unit electrode pattern groove.

7. The apparatus according to claim 1, wherein the plurality of adsorption holes are spaced apart by a predetermined distance in a longitudinal direction from an upper end or a lower end of adjacent unit electrode pattern grooves among plurality of unit electrode pattern grooves, and wherein a longitudinal minimum separation distance ($Dl_{min}$) between a closest among the upper end or the lower end of a respective one of the plurality of unit electrode pattern grooves and respective adsorption holes is from 5 to 30% of a longitudinal length of the respective unit electrode pattern groove.

8. The apparatus according to claim 1, wherein a cross section of each adsorption hole has at least one shape selected from the group consisting of circular, elliptical, polygonal, linear, wave, and zigzag.

9. The apparatus according to claim 1, wherein the cutting stage further comprises:

an air flow guide tube configured to communicate with the plurality of adsorption holes and form a flow of air in a horizontal direction.

10. The apparatus according to claim 9, wherein the cutting stage further comprises an air suction device connected to the air flow guide tube.

11. The apparatus according to claim 1, wherein the lithium metal film supply portion comprises:

a first winding roll configured to hold the lithium metal film in a wound state and release the wound lithium metal film for cutting of the plurality of unit electrodes; and a second winding roll configured to wind the lithium metal film after being cut into the plurality of unit electrodes.

12. The apparatus according to claim 1, wherein the laser irradiation portion is further configured to cut the lithium metal film having a thickness of 30 to 150 µm.

13. The apparatus according to claim 1, wherein adsorption holes of the plurality of adsorption holes located at a central portion of the plurality of unit electrode pattern grooves are located a largest distance away from the edge of the plurality of unit electrode pattern grooves out of the plurality of adsorption holes.

14. The apparatus according to claim 1, wherein the plurality of adsorption holes are located at varying distances from the edge of the plurality of unit electrode pattern grooves.

15. The apparatus according to claim 1, wherein the plurality of adsorption holes are asymmetrically located throughout the plurality of unit electrode pattern grooves with respect to the edge of the plurality of unit electrode pattern grooves.

* * * * *